(12) United States Patent
Nel (10) Patent No.: US 8,859,630 B2
(45) Date of Patent: Oct. 14, 2014

(54) OPERATION OF PROCESSES WHICH EMPLOY A CATALYST THAT DEACTIVATES OVER TIME

(75) Inventor: Herman Gerhardus Nel, Parys (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 0 days.

(21) Appl. No.: 13/881,015

(22) PCT Filed: Oct. 10, 2011

(86) PCT No.: PCT/IB2011/054450
§ 371 (c)(1),
(2), (4) Date: Apr. 23, 2013

(87) PCT Pub. No.: WO2012/056346
PCT Pub. Date: May 3, 2012

(65) Prior Publication Data
US 2013/0210935 A1 Aug. 15, 2013

Related U.S. Application Data

(60) Provisional application No. 61/407,067, filed on Oct. 27, 2010.

(30) Foreign Application Priority Data

Oct. 27, 2010 (ZA) .................................. 2010/07687

(51) Int. Cl.
| | | |
|---|---|---|
| C07C 27/00 | (2006.01) | |
| C10G 2/00 | (2006.01) | |
| B01J 19/18 | (2006.01) | |
| B01J 8/22 | (2006.01) | |
| B01J 8/00 | (2006.01) | |

(52) U.S. Cl.
CPC ................ *C10G 2/332* (2013.01); *C10G 2/344* (2013.01); *B01J 2219/00213* (2013.01); *B01J 2208/00646* (2013.01); *B01J 2208/00637* (2013.01); *B01J 19/185* (2013.01); *B01J 2219/00195* (2013.01); *C10G 2300/4006* (2013.01); *B01J 8/22* (2013.01); *C10G 2/32* (2013.01); *B01J 2219/00229* (2013.01); *C10G 2300/1022* (2013.01); *B01J 8/0035* (2013.01)

USPC .......................................................... 518/700

(58) Field of Classification Search
CPC . G10G 2/32; G10G 2/344; G10G 2300/4006; G10G 2300/1022
USPC .......................................................... 518/700
See application file for complete search history.

(56) References Cited

U.S. PATENT DOCUMENTS

| | | |
|---|---|---|
| 4,927,523 A | 5/1990 | Donnelly |
| 6,458,857 B1 | 10/2002 | Wittenbrink et al. |
| 2003/0087971 A1 | 5/2003 | Steynberg et al. |
| 2005/0026292 A1 | 2/2005 | Alberati-Giani et al. |
| 2005/0027020 A1* | 2/2005 | Steynberg ............... 518/718 |
| 2005/0154069 A1 | 7/2005 | Inga et al. |

OTHER PUBLICATIONS

Search Report and Written Opinion of the International Searching Authority issued in International Application No. PCT/IB2011/054450, dated Feb. 3, 2012 (3 pages).
International Preliminary Report on Patentability issued in International Application No. PCT/IB2011/054450, dated Oct. 8, 2012 (6 pages).

* cited by examiner

*Primary Examiner* — Jafar Parsa
(74) *Attorney, Agent, or Firm* — Fitzpatrick, Cella, Harper & Scinto (57) ABSTRACT

A method of operating a process for catalytically converting one or more reactants to one or more products using a fluid bed reactor containing a catalyst which deactivates over time includes, during a catalyst campaign, in a step A, gradually increasing an operating temperature of the reactor to counteract the negative effect of catalyst deactivation on a conversion rate of the one or more reactants. The operating temperature is not allowed to exceed a selected maximum operating temperature. Thereafter, in a step B, catalyst is added which has the tendency to increase the conversion rate of the one or more reactants into the reactor, and the operating temperature of the reactor is reduced to counteract to at least some extent the effect of the added catalyst on the conversion rate of the one or more reactants. The operating temperature remains above a selected minimum operating temperature during step B. Steps A and B are repeated until the end of the catalyst campaign or until the end of a production run.

14 Claims, 7 Drawing Sheets

OPERATION OF PROCESSES WHICH EMPLOY A CATALYST THAT DEACTIVATES OVER TIME

CROSS-REFERENCE TO RELATED APPLICATIONS

This application is a National Stage Application of International Application No. PCT/IB2011/054450, filed Oct. 10, 2011, which claims the benefit of South African Application No. 2010/07687, filed Oct. 27, 2010 and U.S. Provisional Application No. 61/407,067, filed Oct. 27, 2010.

THIS INVENTION relates to the operation of processes which employ a catalyst that deactivates over time. In particular, the invention relates to a process for converting one or more reactants into one or more products using a catalyst that deactivates over time.

Many processes are known that employ catalysts that deactivate over time. One example of such processes is the Fischer-Tropsch synthesis of hydrocarbons from synthesis gas which includes CO and $H_2$, using a suitable catalyst, such as an iron based or cobalt based catalyst. Cobalt based catalysts are generally very stable under typical Fischer-Tropsch (FT) operating conditions and only suffer minor deactivation over synthesis time. Through continuing research and development efforts, iron based FT catalysts have been improved to the effect that they nowadays can also be operated over prolonged periods of synthesis (months or even years). Nevertheless, it is known that all types of FT catalysts suffer activity loss over time, however gradual it may be. This is also true for the catalysts used in many other processes, such as methanol synthesis or ammonia production.

For commercial application employing large FT reactors, the FT synthesis forms part of a highly integrated gas circuit, which contains various recycle loops and potentially even interfaces with other chemical plants or processes. Any decline in catalyst activity will tend to decrease the conversion achieved in the FT reactors, which not only suppresses the productivity of the process, but also disrupts the so-called gas loop balance and potentially other chemical plants or processes. This can adversely affect the stable operation of the whole complex. Consequently, it is important to take mitigating actions to compensate for the continuous loss in catalytic activity.

It is known that the deactivation behaviour of an FT catalyst is dependent on the operating conditions of the process, such as the operating temperature and the water partial pressure. Certain extreme conditions, such as excessive temperatures, can cause a rapid and severe drop in activity. The operating envelope of a typical FT reactor should be selected to be well clear of such detrimental regions, as the deactivation caused by such extreme conditions may to a large extent be irreversible. The operating temperature of an FT catalyst also affects other areas of catalyst performance, such as the chemical reaction kinetics (which results in an increased rate of reactant conversion with increasing temperature) and the product distribution (which shifts towards lighter products as temperature is increased, leading to a higher methane selectivity). Ideally, the operating conditions of an FT reactor should be maintained in a narrow band where catalyst performance is optimal. This optimum operating point is dependent on aspects such as design constraints, the desired product spectrum, catalyst and equipment cost, etc., but is typically characterised by slow catalyst deactivation, a reaction rate that is sufficiently fast, and a product distribution that is towards the heavier end in order to limit the methane selectivity. This makes three phase slurry bubble column reactors the preferred choice for commercial FT application, since the mixing behaviour inside such reactors can ensure a virtually uniform temperature distribution across the whole reactor so that all catalyst particles are maintained at the optimum temperature.

The conventional method of compensating for gradual catalyst deactivation effects is to increase the operating temperature of the process in order to maintain conversion, since temperature has a positive influence on the chemical reaction kinetics. In FT synthesis, this causes an undesirable shift in the product spectrum to lighter products, most notably methane. Additionally, by continuously increasing the temperature, the operating envelope of the reactor moves into a regime that is unfavourable for catalyst stability, which may accelerate deactivation and in turn require even more severe temperature adjustments. Similar problems exist for other processes which employ catalysts which deactivate over time. Clearly such a methodology is not sustainable and will ultimately lead to an early termination of the production campaign with the involved catalyst batch.

U.S. Pat. No. 6,458,857 teaches an alternative operating methodology to mitigate the effects of FT catalyst deactivation on the performance of the process. This entails reducing the gas feed rate to the reactor (by more than 50%), while keeping the operating temperature constant at the starting value, in order to maintain conversion. This of course has the adverse effect that the reactor productivity is reduced proportionally. For instance, in the example of the invention supplied by U.S. Pat. No. 6,458,857, the reactor productivity decreased by about 60% over a period of 151 days (ca. 5 months). This approach may also pose problems in slurry bubble columns if the superficial linear gas velocity through the reactor drops too low for adequate mixing and suspension of catalyst in the slurry bed. U.S. Pat. No. 6,458,857 also teaches that, once a predetermined lower boundary for the gas feed rate has been reached, the temperature can optionally be ramped up in order to maintain conversion. As a further option, it is mentioned that additional fresh catalyst can be introduced up to the maximum catalyst load. Importantly, U.S. Pat. No. 6,458,857 teaches that this be done prior to the adjustment of the gas feed rate. In other words, U.S. Pat. No. 6,458,857 teaches that the following actions should be taken in succession (not parallel) and in the order presented to mitigate the effects of FT catalyst deactivation: first increase the catalyst inventory to the maximum load that the reactor can accommodate, thereafter decrease the gas feed rate to the reactor as necessary until the lower limit is reached, and then increase the operating temperature to maintain conversion. A primary aim of this operating philosophy is therefore to load the full catalyst inventory into the reactor as soon as possible and before any other actions are taken.

WO 2005/026292 claims a process for making up catalyst to a slurry FT reactor in order to compensate for loss of catalytic material from the reactor due to purges from the solids separation system, as well as loss of catalyst activity. The disclosure centres on the conditioning of the catalyst by initially exposing the catalyst to mild reaction conditions and gradually approaching the desired synthesis conditions. The type of catalyst addition as taught by WO 2005/026292 is effective to compensate for losses in catalytic material from the reactor. However, continuous indiscriminate loading of catalyst to the reactor over and above the amount of catalytic material that has been lost through the solids separation section will clearly result in an overloading of the reactor, resulting in problems with proper fluidisation of the catalyst bed, more difficult filtration, etc. As such, WO 2005/026292 does not teach an effective operating strategy to deal with gradual catalyst deactivation over an entire catalyst campaign, as no other process adjustments are disclosed or suggested.

US 2003/0087971 claims a method of loading FT catalyst into an FT slurry phase reactor. A procedure for starting up the reactor is also disclosed. The procedure entails loading clean molten wax into the reactor whilst bubbling syngas through the liquid. While maintaining the reactor temperature at a level sufficiently low to prevent any FT synthesis, batches of catalyst are transferred to the reactor until between 25% and 50% of the full inventory has been loaded into the reactor. After this has been achieved, the reactor temperature is gradually raised until the desired synthesis temperature is approached. Subsequently, the gas feed rate is adjusted and the rest of the catalyst inventory loaded to achieve full synthesis conditions. It is important to note that the combination of catalyst loading procedure and temperature adjustment is aimed at achieving stable steady state synthesis with the full catalyst load as quickly as possible without damaging the catalyst. In fact, US 2003/0087971 remarks that a cobalt based FT catalyst does not require regeneration or replacement for a number of years due to the stability of this kind of catalyst. Therefore, US 2003/0087971 does not teach anything about the procedure that should be applied to compensate for the longer term catalyst deactivation that inevitably occurs.

To conclude, the identified patent literature concerning start-up procedures or a longer term operating philosophy generally teaches that the full catalyst inventory should be added to the reactor at the start of a production campaign.

An effective long term operating procedure for processes suffering from catalyst deactivation over time would be desirable.

According to the invention, there is provided a method of operating a process for catalytically converting one or more reactants to one or more products using a fluid bed reactor containing a catalyst which deactivates over time, which method includes, during a catalyst campaign, in a step A, gradually increasing an operating temperature of the reactor to counteract the negative effect of catalyst deactivation on a conversion rate of said one or more reactants, the operating temperature not exceeding a selected maximum operating temperature;

in a step B, adding catalyst which has the tendency to increase the conversion rate of said one or more reactants into the reactor, and reducing the operating temperature of the reactor to counteract to at least some extent the effect of the added catalyst on the conversion rate of said one or more reactants, the operating temperature remaining above a selected minimum operating temperature; and repeating steps A and B until the end of the catalyst campaign or until the end of a production run.

The fluid bed reactor may be a three-phase slurry bubble column reactor containing a continuous liquid phase in addition to gas and solid phases, or a two-phase fluidised bed reactor having gas and solid phases, but no continuous liquid phase. The temperature gradient over such reactors are typically less than 10° C., preferably less than 5° and more preferably 2° C. or less. The operating temperature of the reactor can be defined in any suitable way known to persons skilled in the art and can, for example, be the temperature at one specific point inside the reactor, the average or a weighted average of temperatures measured a certain set of predetermined positions inside the reactor or the like.

In a preferred embodiment of the invention, the process is operated such that reactor productivity remains substantially constant (e.g. does not vary by more than about 25%) during periods of stable operation during the catalyst campaign. In some instances though, there may be deviations from stable operation, such as when process upsets occur, when the operation of the reactor needs to be interrupted for some reason, around the time when catalyst is loaded or unloaded from the reactor, or when the set point temperature of the reactor is changed. Typically the reactant feed rate to the reactor will not vary by more than about 25% and the conversion of said one or more reactants will not vary by more than 20 percentage points. The reactor productivity can be defined in any way that is suitable for the involved process. For example, in the case of a Fischer-Tropsch process, the productivity can be expressed as the mass of hydrocarbon produced per unit time, as the rate of CO conversion to hydrocarbons on a mass or molar basis or the like.

Gradually increasing the operating temperature of the reactor during step A may include increasing the operating temperature stepwise over a period of time until the selected maximum operating temperature has been reached. The operating temperature may be increased in equal increments, e.g. 0.5° C. or 1° C. The process may be operated for an extended period, counted in days, at each operating temperature and the length of these periods may change as the production or catalyst campaign proceeds due to the specific deactivation profile of the catalyst. Accordingly, the process may for example be operated for a period of 1 to 3 days at each operating temperature at the beginning of a production or catalyst campaign, but up to 10 days or even longer towards the end of the production or catalyst campaign.

Increasing the operating temperature of the reactor may be effected in any conventional manner suitable for the process in which the method of the invention is being applied. For example, the operating temperature, for an exothermic process, may be increased by reducing any cooling of the reactor employed for converting said one or more reactants into said one or more products.

As will be appreciated, the addition of catalyst to the reactor in step B has the effect of increasing the ability of the reactor to convert reactants, i.e. to increase the conversion rate of said one or more reactants. This increased ability to convert reactants may simply be due to the increased mass of catalyst inside the reactor (in the event that more catalyst is loaded than is being unloaded), or as a result of an increase in the average activity of the catalyst inside the reactor (if the activity of the added catalyst is higher than the average activity of catalyst inside the reactor just prior to the catalyst addition), or both. The increased potential of the reactor to convert reactants is counteracted by lowering the temperature in step B. It will be appreciated by those skilled in the art that, during step B, the amount of catalyst added, the activity of the catalyst added, and the extent by which the temperature is decreased are selected in combination with each other to ensure that the reactor productivity before and after step B is substantially unchanged. Preferably, the catalyst is added without interrupting the operation of the reactor.

Adding catalyst in step B may include adding a catalyst with a higher average activity than the average activity of the catalyst already used in the reactor, to the reactor, thereby abruptly increasing the average activity of the catalyst in the reactor. As will be appreciated, the catalyst with higher activity may be fresh catalyst not previously used, catalyst already used but with a higher activity than the catalyst present in the reactor, or a previously used reactivated catalyst. Reactivation of a previously used catalyst, when the catalyst is a Fischer-Tropsch catalyst or a similar catalyst, may be effected by means of a hydrogen rejuvenation treatment, or by a regeneration treatment involving amongst others an oxidation step and a reduction step. In principle, it is also possible to increase the average activity of the catalyst by adding a different catalyst with higher activity than the catalyst being used in the reactor, to the reactor.

The method may thus include starting the catalyst campaign with a catalyst inventory inside the reactor that is only a fraction of a full catalyst inventory. Catalyst is then added each time in step B until, after repeated cycles of step A and step B, the full catalyst inventory has been reached. As mentioned hereinbefore, the catalyst being added may have a higher activity than the catalyst already in the reactor. After operating the process then for some time with the full catalyst inventory, and increasing the operating temperature according to step A to the maximum operating temperature, the conversion of the one or more reactants will drop to an unacceptable level as a result of the deactivation of the full catalyst inventory, and the process or reactor must be stopped or shut down for catalyst replacement, i.e. the catalyst or production campaign must be ended. Typically, the full catalyst inventory is then removed from the reactor and the reactor is restarted with a fresh catalyst inventory and operated in accordance with the method of the invention.

When the method includes starting said catalyst campaign with a catalyst inventory that is only a fraction of a full catalyst inventory, the catalyst inventory at the start of the catalyst campaign may be less than about 70% of a full catalyst inventory, preferably less than about 50% of a full catalyst inventory, more preferably less than about 30% of a full catalyst inventory. These values are particularly preferred when the catalyst is a Fischer-Tropsch catalyst, but may also be applicable to similar catalysts.

When the method includes starting said catalyst campaign with a catalyst inventory that is only a fraction of a full catalyst inventory, the catalyst added during each step B may be less than about 15% by mass of a full catalyst inventory, preferably less than about 10% by mass of a full catalyst inventory, more preferably less than about 8% by mass of a full catalyst inventory, even more preferably less than about 7% by mass of a full catalyst inventory, e.g. about 5% by mass of a full catalyst inventory. Typically the catalyst added during each step B is at least about 1% by mass of a full catalyst inventory, preferably at least about 2% by mass of a full catalyst inventory, more preferably at least about 3% by mass of a full catalyst inventory. These values are particularly preferred when the catalyst is a Fischer-Tropsch catalyst, but may also be applicable to similar catalysts.

In one embodiment of the method of the invention, the method includes removing a portion of the catalyst from the catalyst inventory. For example, a portion of the catalyst may be removed from the reactor when catalyst with a higher activity than catalyst already being used in the reactor is added. Typically, however, in this embodiment of the invention, the catalyst inventory increases over time during the catalyst campaign as steps A and B are repeated until the full catalyst inventory is reached, even though a portion of the catalyst is removed from the catalyst inventory from time to time.

Instead, the method of the invention may include maintaining the catalyst inventory more or less constant by removing catalyst from the reactor and replacing the removed catalyst with substantially the same amount of catalyst with a higher average activity than catalysts already forming part of the catalyst inventory, i.e. than catalyst removed at that time from the reactor. The catalyst may be removed, for example, just before or during step B.

The process may thus be a hydrocarbon synthesis process. In particular, the process may thus be a Fischer-Tropsch process for synthesizing hydrocarbons from synthesis gas which includes CO and $H_2$. The process may employ a three-phase slurry bubble column or a two-phase fluidized bed reactor for the hydrocarbon synthesis, or a combination of such reactors. Typically, tail gas recycle is employed to improve overall conversion of reactants, i.e. synthesis gas.

When the process is a Fischer-Tropsch process for synthesizing hydrocarbons from synthesis gas which includes CO and $H_2$, and in accordance with one embodiment of the invention, the Fischer-Tropsch hydrocarbon synthesis process includes a synthesis reactor operating at a temperature of less than 300° C. Typically, the Fischer-Tropsch hydrocarbon synthesis process in this embodiment of the invention includes a synthesis reactor operating at a temperature of between 160° C. and 300° C., preferably between 220° C. and 260° C., e.g. about 240° C. The Fischer-Tropsch hydrocarbon synthesis process may thus employ a high chain growth, typically slurry bed, reaction stage or reactor, operating at a predetermined operating pressure in the range 10 to 50 bar, e.g. about 30 bar.

Instead, or in addition, when the process is a Fischer-Tropsch process for synthesizing hydrocarbons from synthesis gas which includes CO and $H_2$, and in accordance with another embodiment of the invention, the Fischer-Tropsch hydrocarbon synthesis process includes a high temperature Fischer-Tropsch hydrocarbon synthesis reactor operating at a temperature of at least 320° C. Typically, such a high temperature Fischer-Tropsch hydrocarbon synthesis reactor operates at a temperature of between 320° C. and 380° C., e.g. about 350° C., and at an operating pressure in the range of 10 to 50 bar, typically below 45 bar. Such a high temperature Fischer-Tropsch hydrocarbon synthesis reactor is a low chain growth reactor, typically a two-phase fluidised bed reactor. In contrast to a low temperature Fischer-Tropsch hydrocarbon synthesis reactor, which may be characterised by its ability to maintain a continuous liquid product phase in a slurry bed, the high temperature Fischer-Tropsch hydrocarbon synthesis reactor cannot produce a continuous liquid product phase in its fluidised bed.

For at least Fischer-Tropsch synthesis, the catalyst may be an iron based catalyst or a cobalt based catalyst. Typically, cobalt based catalysts are supported catalysts, e.g. an alumina-supported catalyst.

When the process is a Fischer-Tropsch process for synthesizing hydrocarbons from synthesis gas which includes CO and $H_2$, the minimum operating temperature and the maximum operating temperature may be selected to be no more than about 10° C. apart, preferably no more than about 5° C. apart, more preferably no more than about 3° C. apart.

Step B may be initiated when conversion of said one or more reactants drops to a selected lower limit. The selected lower conversion limit of the one or more reactants may be no more than about 20 percentage points less than a maximum conversion of the one or more reactants obtained during the catalyst campaign. Preferably, the selected lower conversion limit of the one or more reactants is at most about 10 percentage points, more preferably at most about 5 percentage points less than the maximum conversion of the one or more reactants obtained during the catalyst campaign. In other words, during the catalyst campaign, conversion may vary by at most about 20 percentage points, preferably no more than about 10 percentage points, more preferably at most about 5 percentage points.

Overall production rate of products during the catalyst campaign may vary by at most about 25%, more preferably by at most about 10%. This may be achieved by appropriate selection of the minimum operating temperature, the maximum operating temperature, the lower conversion limit, the catalyst inventory used during the campaign, and the amount of tail gas recycle employed when tail gas recycle to the fluid bed reactor is present, whilst maintaining a substantially constant feed rate for the one or more reactants.

As will be appreciated, the method of the invention will be applied once the process has been started and has reached a stable operation, at an operating temperature no greater than the maximum operating temperature. Any conventional or suitable approach may be used to load catalyst into the reactor and to start the process. When the process is a Fischer-Tropsch process for synthesizing hydrocarbons from synthesis gas which includes CO and $H_2$, the method disclosed in US 2003/0087971 may be used, for example, to load the catalyst and to start the reactor up.

The invention will now be described with reference to the following comparative examples and the drawings.

PRIOR ART EXAMPLE

Figure 1:
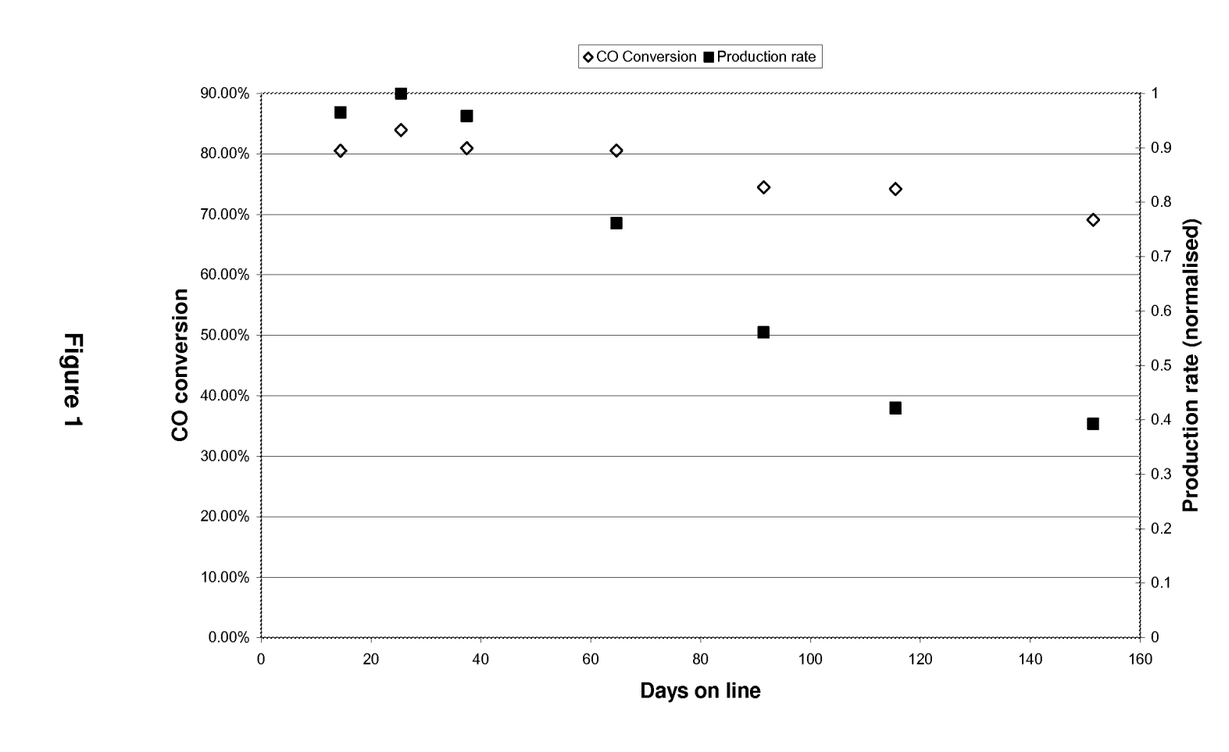
FIG. 1 shows graphs of estimated normalised overall hydrocarbon production rate, and reported CO conversion, as a function of time for a Fischer-Tropsch process operated according to the prior art methodology taught in U.S. Pat. No. 6,458,857, using data presented in U.S. Pat. No. 6,458,857.

The overall hydrocarbon production rate for a low temperature slurry bed Fischer-Tropsch process, utilising a cobalt based catalyst and operated according to the methodology taught by U.S. Pat. No. 6,458,857, was estimated from data reported in the specification of U.S. Pat. No. 6,458,857 and is presented in FIG. 1, along with the CO conversion reported in the specification of U.S. Pat. No. 6,458,857. As can be noted from FIG. 1, the prior art method taught in U.S. Pat. No. 6,458,857 resulted in about a 60% decrease in overall production rate, which is clearly undesirable.

COMPARATIVE EXAMPLES

Simulations, incorporating detailed reactor, kinetic and catalyst deactivation models, were performed according to the operating philosophy of the present invention. In all cases, the process simulated was a Fischer-Tropsch synthesis using a commercial cobalt based catalyst in a three phase slurry bubble column reactor.

Example 1

Figure 2:
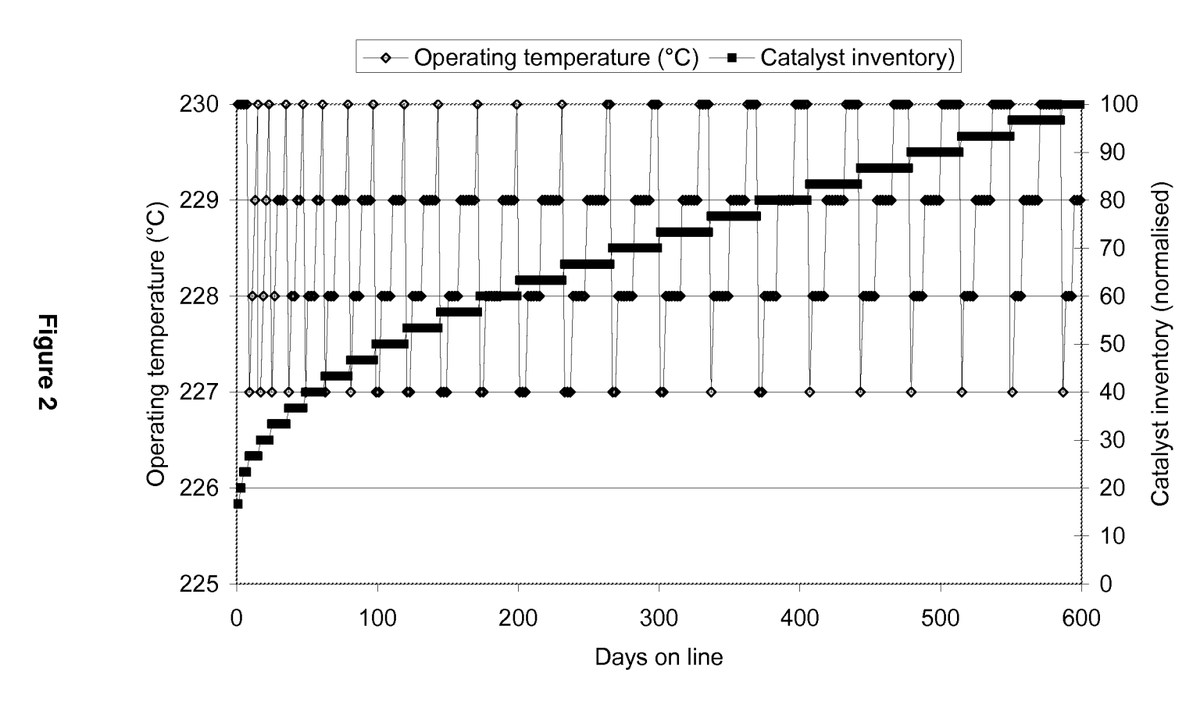
FIG. 2 shows graphs of the incremental loading of catalyst over time, while the operating temperature varies stepwise and in cycles over time between 227° C. and 230° C., for a process using a low temperature Fischer-Tropsch slurry bed reactor operated in accordance with one embodiment of the method of the invention.
Figure 3:
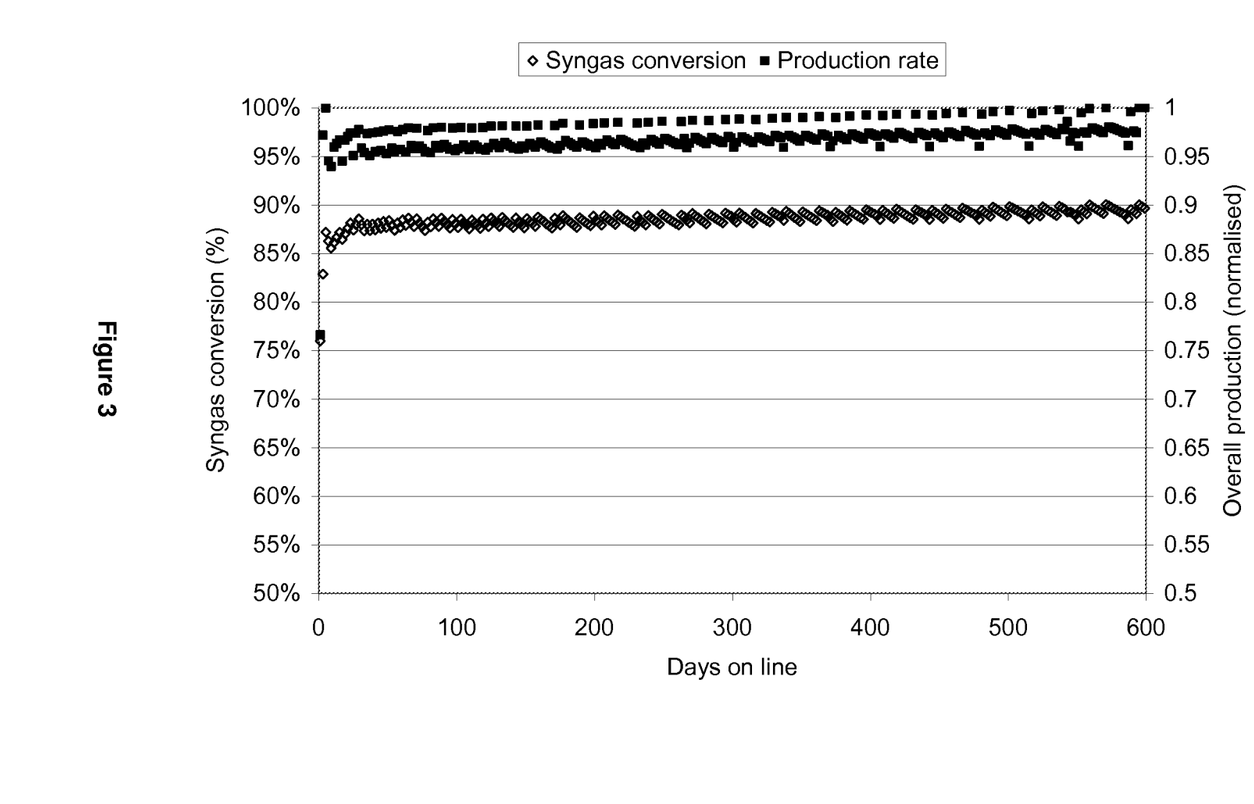
FIG. 3 shows graphs of the predicted normalised overall hydrocarbon production rate, together with the synthesis gas conversion, as a function of time for the process of FIG. 2.

FIG. 2 shows the incremental loading of catalyst during a simulated production campaign of about 600 days, while the operating temperature varies stepwise between 227° C. and 230° C. in 1° C. increments. The predicted normalised overall hydrocarbon production rate, together with the syngas conversion, is presented in FIG. 3. This illustrates that the conversion and the total production rate can be maintained in a very narrow band (with a spread of about 5 to 6 percentage points) after the initial start-up period of a few days. This means that all other sections of a plant employing a low temperature Fischer-Tropsch slurry bed reactor operated in accordance with the method of the invention (e.g. syngas generation and product work-up sections) can be designed for and operated at a substantially constant capacity, which is the most cost-effective design.

Example 2

Figure 4:
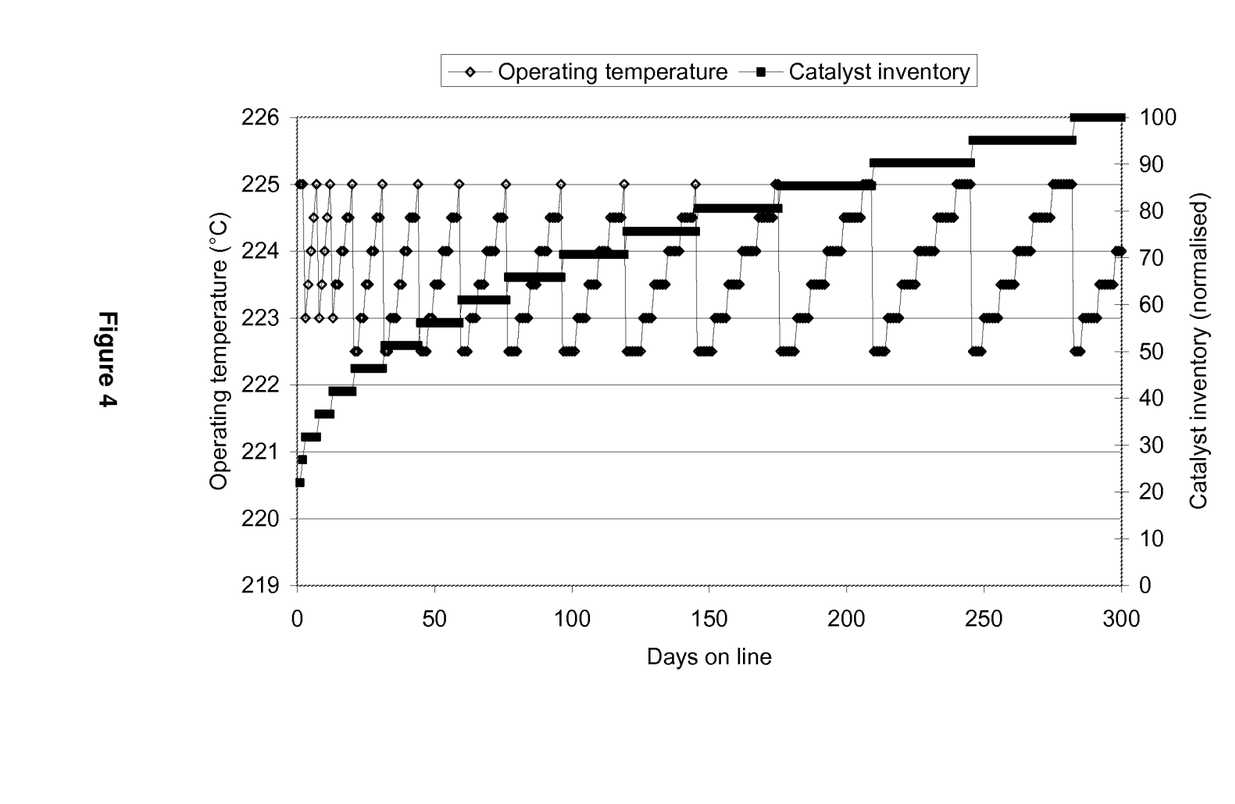
FIG. 4 shows graphs of the incremental loading of catalyst over time, while the operating temperature varies, after stabilisation of the process, stepwise and in cycles over time between 222.5° C. and 225° C., for a process using a low temperature Fischer-Tropsch slurry bed reactor operated in accordance with one embodiment of the method of the invention.
Figure 5:
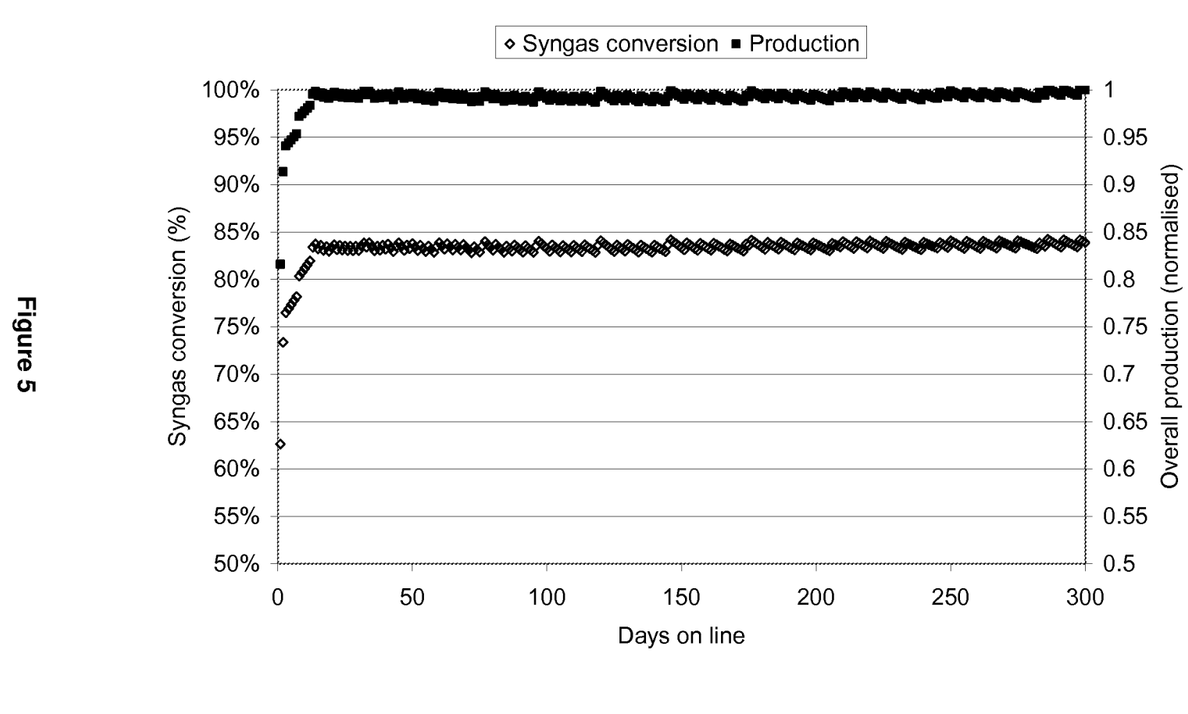
FIG. 5 shows graphs of the predicted normalised overall hydrocarbon production rate, together with the synthesis gas conversion, as a function of time for the process of FIG. 4.

FIG. 4 shows the incremental loading of catalyst during the first 300 days of a simulated production campaign operated in accordance with the method of the invention, while the operating temperature is adjusted upwards incrementally and stepwise in 0.5° C. increments. The initial batch size at the start of the campaign was about 22% of the load achieved at the end of the campaign, while the batch size for loading was about 5% of the final load. The predicted normalised overall hydrocarbon production rate, together with the syngas conversion, is presented in FIG. 5. During the initial start-up period of about two to three weeks, the temperature varies between 223° C. and 225° C. and some variations in the production rate are observed. After the start-up period, the temperature is varied between 222.5° C. and 225° C. and the conversion and the total production rate can be maintained at essentially constant values.

Example 3

Figure 6:
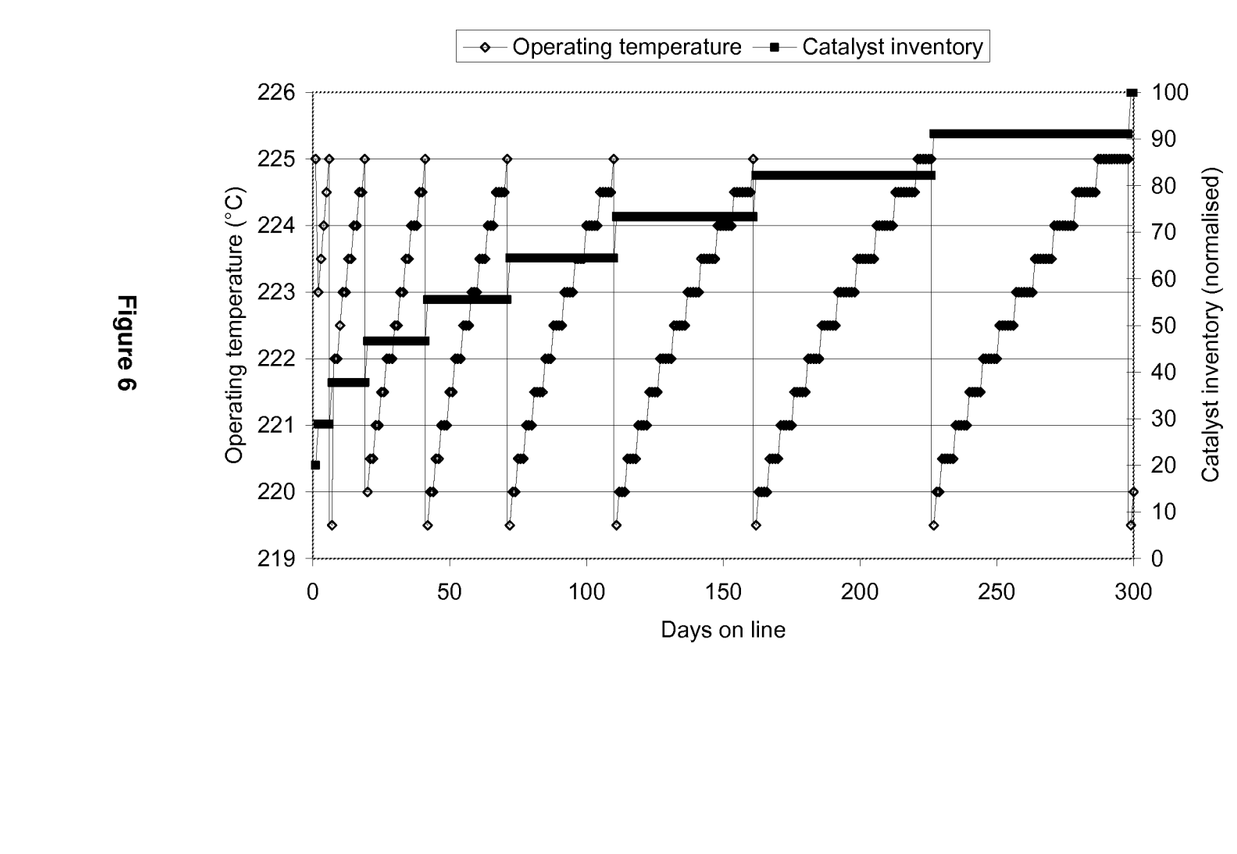
FIG. 6 shows graphs of the incremental loading of catalyst over time, while the operating temperature varies, after stabilisation of the process, stepwise and in cycles over time between 219.5° C. and 225° C., for a process using a low temperature Fischer-Tropsch slurry bed reactor operated in accordance with another embodiment of the method of the invention.
Figure 7:
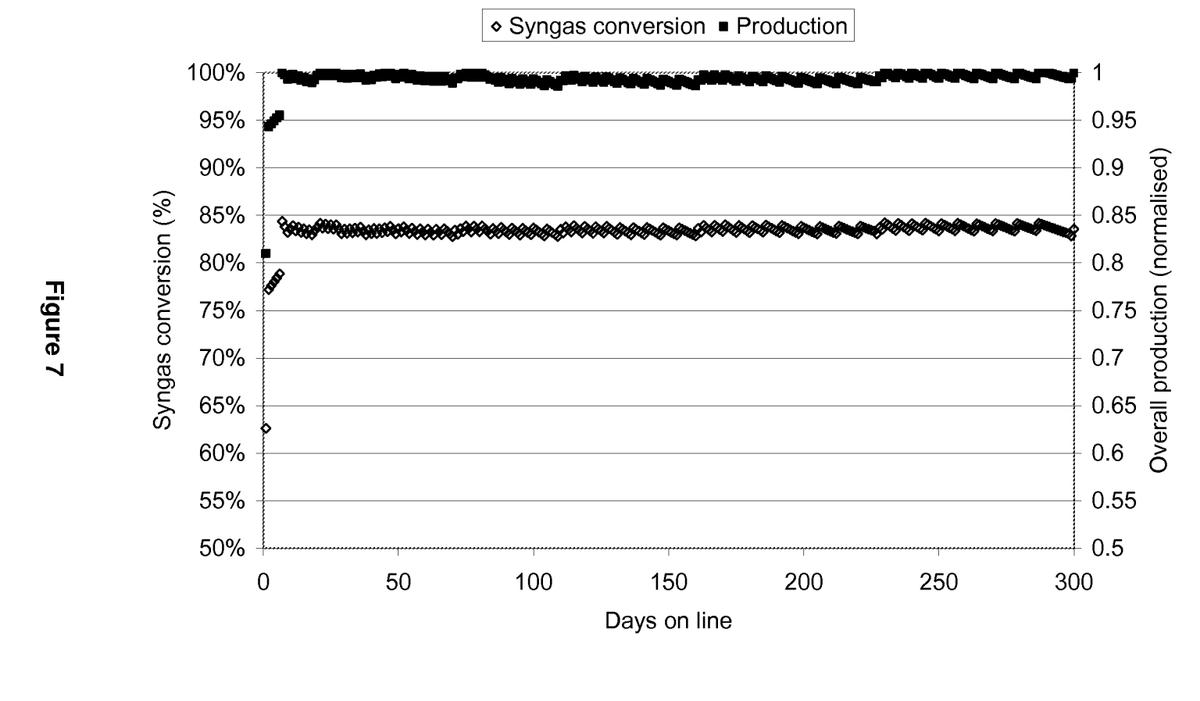
FIG. 7 shows graphs of the predicted normalised overall hydrocarbon production rate, together with the synthesis gas conversion, as a function of time for the process of FIG. 6.

This example is the same as Example 2, except for the fact that larger batches of catalyst are loaded at a time. As a result, the temperature has to be varied over a wider range, namely from 219.5° C. to 225° C. (see FIG. 6), in order to maintain the conversion and production rates after start-up at essentially constant values (see FIG. 7). The initial batch size at the start of the campaign was about 20% of the load achieved at the end of the campaign, while the batch size for loading was about 9% of the final load. Therefore, loading smaller batches more frequently as in Example 2 rather than larger batches less frequently as in Example 3 has the advantage that the temperature can be varied over a narrower range, thereby keeping the temperature closer to the optimum value for the involved catalyst.

The operating method according to the invention, as illustrated, has many advantages over the art recognised methodologies. By operating a Fischer-Tropsch hydrocarbon synthesis slurry bed process in a very narrow temperature band (typically 5 degrees Celsius or less), the catalyst is always operated close to the optimum temperature where the methane selectivity and the deactivation rate are low, but where CO conversion is acceptable. Unlike the procedure taught by U.S. Pat. No. 6,458,857, the gas feed rate to the reactor and the production rate of the reactor are essentially maintained at constant levels. This has major advantages due to the highly integrated nature of a typical Fischer-Tropsch hydrocarbon synthesis facility, and would also be beneficial to many other chemical plants or processes employing a catalyst that deactivates over time, e.g. methanol or ammonia synthesis.

It is well known that the syngas production section constitutes the largest cost component of a gas to liquids (GTL) or coal to liquids (CTL) facility. By maintaining a constant syngas feed rate to the Fischer-Tropsch reactor, a constant syngas production rate is required, which in turn means that the syngas production unit can always operate at its design capacity to make most efficient use of this very expensive equipment. Other plant sections or factories that are integrated with the Fischer-Tropsch gas loop can also be operated at constant capacity. In fact, the stable operation of the gas loop, which results from the operating method of the invention, as illustrated, also means that all equipment can be sized according to a specific requirement and will generally always be operated at their design capacity, which is clearly the most cost-effective design. It has further been found that the procedure of starting a production campaign with only part of the full catalyst inventory and loading the balance gradually over time, in accordance with one embodiment of the invention, allows for the most efficient use of a given batch of catalyst before replacement or regeneration is required. The invention therefore also provides a method of optimising catalyst usage during a catalyst or production campaign.

The invention claimed is:

1. A method of operating a hydrocarbon synthesis process for catalytically converting one or more reactants to one or more products using a fluid bed reactor containing a catalyst which deactivates over time, which method includes, during a catalyst campaign,
   in a step A, gradually increasing an operating temperature of the reactor to counteract the negative effect of catalyst deactivation on a conversion rate of said one or more reactants, the operating temperature not exceeding a selected maximum operating temperature;
   in a step B, adding catalyst which has the tendency to increase the conversion rate of said one or more reactants into the reactor, and reducing the operating temperature of the reactor to counteract to at least some extent the effect of the added catalyst on the conversion rate of said one or more reactants, the operating temperature remaining above a selected minimum operating temperature; and
   repeating steps A and B until the end of the catalyst campaign or until the end of a production run.

2. The method as claimed in claim 1, in which the fluid bed reactor is a three-phase slurry bubble column reactor containing a continuous liquid phase in addition to gas and solid phases.

3. The method as claimed in claim 1, in which the fluid bed reactor is a two-phase fluidised bed reactor having gas and solid phases, but no continuous liquid phase.

4. The method as claimed in claim 1, in which the process is operated such that reactor productivity remains substantially constant during periods of stable operation during the catalyst campaign, with the feed rate of said one or more reactants to the fluid bed reactor not varying by more than 25% and the conversion of said one or more reactants not varying by more than 20 percentage points.

5. The method as claimed in claim 1, in which gradually increasing the operating temperature of the reactor during step A includes increasing the operating temperature stepwise over a period of time until the selected maximum operating temperature has been reached.

6. The method as claimed in claim 1, in which during step B, the amount of catalyst added, the activity of the catalyst added, and the extent by which the temperature is decreased are selected in combination with each other to ensure that the reactor productivity before and after step B is substantially unchanged.

7. The method as claimed in claim 1, in which adding catalyst in step B includes adding a catalyst with a higher average activity than the average activity of the catalyst already used in the reactor, to the reactor, thereby abruptly increasing the average activity of the catalyst in the reactor.

8. The method as claimed in claim 1, which includes starting the catalyst campaign with a catalyst inventory inside the reactor that is only a fraction of a full catalyst inventory.

9. The method as claimed in claim 8, which includes from time to time removing a portion of the catalyst from the catalyst inventory, the catalyst inventory however increasing over time during the catalyst campaign as steps A and B are repeated until the full catalyst inventory is reached.

10. The method as claimed in claim 8, which includes maintaining the catalyst inventory more or less constant by removing catalyst from the reactor and replacing the removed catalyst with substantially the same amount of a catalyst with a higher average activity than the average activity of the catalyst already forming part of the catalyst inventory.

11. The method as claimed in claim 1, in which the process is a Fischer-Tropsch process for synthesizing hydrocarbons from synthesis gas which includes CO and $H_2$, the minimum operating temperature and the maximum operating temperature being selected to be no more than 10° C. apart.

12. The method as claimed in claim 1, in which step B is initiated when conversion of said one or more reactants drops to a selected lower limit.

13. The method as claimed in claim 12, in which the selected lower conversion limit of said one or more reactants is no more than 20 percentage points less than a maximum conversion of the one or more reactants obtained during the catalyst campaign.

14. The method as claimed in claim 13, in which the minimum operating temperature, the maximum operating temperature, the lower conversion limit, a catalyst inventory used during the campaign, and an amount of tail gas recycle employed when tail gas recycle to the fluid bed reactor is present, are selected such that whilst maintaining a substantially constant feed rate for said one or more reactants, overall production rate of products during the catalyst campaign varies by at most 25%.

* * * * *